(12) United States Patent
Manasra

(10) Patent No.: US 12,113,427 B2
(45) Date of Patent: Oct. 8, 2024

(54) LINEAR ELECTRIC GENERATOR

(71) Applicant: YAFA INNOVATIONS LTD, Haifa (IL)

(72) Inventor: Salih Manasra, Haifa (IL)

(73) Assignee: YAFA INNOVATIONS LTD., Haifa (IL)

( * ) Notice: Subject to any disclaimer, the term of this patent is extended or adjusted under 35 U.S.C. 154(b) by 0 days.

(21) Appl. No.: 18/277,988

(22) PCT Filed: Feb. 22, 2022

(86) PCT No.: PCT/IL2022/050208
§ 371 (c)(1),
(2) Date: Aug. 19, 2023

(87) PCT Pub. No.: WO2022/180629
PCT Pub. Date: Sep. 1, 2022

(65) Prior Publication Data
US 2024/0146152 A1    May 2, 2024

(30) Foreign Application Priority Data
Feb. 24, 2021    (IL) .......................................... 281086

(51) Int. Cl.
*H02K 7/18*    (2006.01)
*F01B 7/14*    (2006.01)
(Continued)

(52) U.S. Cl.
CPC ............. *H02K 7/1884* (2013.01); *F01B 7/14* (2013.01); *F02B 63/041* (2013.01); *F02B 75/28* (2013.01)

(58) Field of Classification Search
CPC ....... H02K 7/1884; F01B 7/14; F02B 63/041; F02B 75/28
(Continued)

(56) References Cited

U.S. PATENT DOCUMENTS

2005/0109295 A1*  5/2005  Kaneko ................... F02B 71/04
                                                              123/46 E
2012/0125291 A1*  5/2012  Simpson ................. F02B 71/04
                                                              123/46 E
(Continued)

FOREIGN PATENT DOCUMENTS

WO        00/29732 A1     5/2000
WO     2019/149304 A1     8/2019

*Primary Examiner* — Ahmed Elnakib
(74) *Attorney, Agent, or Firm* — SALIWANCHIK, LLOYD & EISENSCHENK

(57) ABSTRACT

The present invention refers to a linear electric generator, comprising: at least one intake port; at least one expansion chamber, and at least one expansion piston; at least one central cylinder; at least two reduced cylinders, wherein the diameter of said reduced cylinders is smaller than the diameter of the central cylinder, and wherein each reduced cylinder comprises a partition; at least one electric power-generating set of pistons, wherein each piston of said set of pistons is located inside the central cylinder and is suitable to linearly move inside the inner void of a reduced cylinders through the partitions of the reduced cylinders, and wherein each said piston is connected to an oscillator; at least one fluid chamber suitable to comprise incompressible fluid, wherein said fluid chamber is the void between the edge of the expansion piston closer to the electric power-generating pistons and the electric power-generating pistons themselves; at least two sets of magnets, wherein each set of magnets is attached to an oscillator; at least two end sections that comprise coil windings; and at least one outlet port, suitable to allow the evacuation of fluids from said expansion chamber. The invention also refers to a method for energy transformation.

20 Claims, 3 Drawing Sheets

(51) Int. Cl.
  *F02B 63/04*   (2006.01)
  *F02B 75/28*   (2006.01)
(58) Field of Classification Search
  USPC .................................................. 310/12.12
  See application file for complete search history.

(56) References Cited

U.S. PATENT DOCUMENTS

2022/0154634 A1\* 5/2022 Famouri ................. F02B 71/04
2024/0146152 A1\* 5/2024 Manasra ................. F02B 75/28

\* cited by examiner

LINEAR ELECTRIC GENERATOR

CROSS REFERENCE TO RELATED APPLICATIONS

This application is a National Stage Application of International Application Number PCT/IL2022/050208, filed Feb. 22, 2022; which claims priority to Israeli Application No. 281086, filed on Feb. 24, 2021.

FIELD OF THE INVENTION

The present invention is in the field of linear electric generators. More specifically, the invention relates to the field of a free-piston linear electric generator that is suitable to operate on compressed gas, such as air, as a source of initial motion of the components of the generator.

BACKGROUND OF THE INVENTION

According to the prior art, engines often comprise multiple moving components, which involve contact of said components that causes the grinding of said components, thus shortens the lifetime of the engines. Such mechanisms are obviously in increased need for maintenance, and the frequent friction between the components also reduces the efficiency of the engines due to energy losses and deformation of different components as a result of the undesirable grinding process.

A linear electric generator translates a mechanical input into an electrical current. It is known, for example, to utilize a belt-driven shaft to provide an input to the alternator. Alternators utilize induction to generate electricity. It is known, for example, to generate electric current utilizing relative motion between permanent magnets and windings (i.e., coils) of electrically conductive wire to generate current. Different numbers of configurations of magnets and windings are utilized to different effects upon the generated current.

An exemplary linear generator is a device that includes a stationary cylinder and a piston that is located within the cylinder and is suitable to linearly move within the cylinder. By positioning a magnet (or magnets) on the inner wall of the cylinder, and positioning coils on the outer surface of the piston, the movement of said piston inside said cylinder creates the flow of electrical current. According to other exemplary linear generators, the positioning of the magnet(s) and coils is opposite so that the magnets are positioned on the outer surface of the piston, while the coils are positioned on the inner surface of the cylinder.

According to the prior art, many opposed-piston engines include a combustion chamber disposed between two pistons. As combustion occurs within the combustion chamber, the pistons are driven in opposite directions, away from the combustion chamber. Such engines also include a rebound mechanism, suitable to cause the pistons to return toward the center of the apparatus in preparation for the next cycle, thus preventing the need for the use of a crankshaft.

It is an object of the present invention to provide a free-piston linear generator (that for the sake of brevity is also referred to simply as "FPLG") that allows an operation with an input of a fluid in a relatively low pressure.

It is another object of the present invention to provide an FPLG that elongates a shorter expansion stroke while increasing the magnet oscillator stroke, the operating frequency, and ultimately increases power output.

Other objects and advantages of the invention will become apparent as the description proceeds.

SUMMARY OF THE INVENTION

The present invention refers to a linear electric generator, which comprises: at least one intake port; at least one expansion chamber; at least one expansion piston; at least one central cylinder; at least two reduced cylinders, wherein the diameter of said reduced cylinders is smaller than the diameter of the central cylinder, and wherein each reduced cylinder comprises a partition.

The generator, according to the present invention, also comprises at least one electric power-generating set of pistons, wherein each piston of said set of pistons is located inside the central cylinder and is suitable to linearly move inside the inner void of the reduced cylinders through the partitions of the reduced cylinders, and wherein each said piston is connected to an oscillator. The phrase "electric power-generating pistons" refers to the pistons that are connected to oscillators that take part in the electric power-generating process, as will be described in detail along the following description and shown in the figures.

The generator, according to the present invention, also comprises at least one fluid chamber that comprises incompressible fluid, wherein said fluid chamber is the void between the edge of the expansion piston closer to the electric power-generating pistons and the electric power-generating pistons themselves. The incompressible fluid acts as a liquid connecting rod that transfers the linear motion from the expansion chamber to the oscillator. The generator of the present invention also comprises at least two sets of magnets, wherein each set of magnets is attached to an oscillator, at least two end sections that comprise coil windings, and at least one outlet port, suitable to allow the evacuation of fluids from said expansion chamber. According to one embodiment of the invention, the magnets are permanent magnets, and according to another embodiment of the invention, the coil windings are made of rectangular-shaped wiring.

According to one embodiment, the linear electric generator of the present invention comprises a central cylinder that comprises at least one intake port, at least one expansion chamber, at least one first set of pistons, and at least one second set of pistons; at least two reduced cylinders, wherein the diameter of the reduced cylinders is smaller than the diameter of the central cylinder, and wherein each reduced cylinder comprises a partition; a third set of pistons, wherein each piston of third set of pistons is suitable to linearly move inside the inner void of a reduced cylinders through the partitions of the reduced cylinders, and wherein each said piston is connected to an oscillator. According to one embodiment of the invention, the reduced cylinders further comprise holes suitable to allow the inlet of fluids.

The intake port is suitable to be connected to an intake fluid source by suitable connection means, such as suitable connecting tubes. According to one embodiment of the invention, the intake fluid source is a compressed-air. According to another embodiment of the invention, the connection means between the intake port and the intake fluid source comprise a flow valve and/or a pressure gauge.

According to another embodiment of the invention, the end sections of the generator further comprise ventilation openings, and according to yet another embodiment of the invention the end sections of the generator further comprise a rebound mechanism. Such a rebound mechanism can be, for example, an air-spring or a mechanical spring.

According to another embodiment of the invention, the generator further comprises at least one electronic unit and/or sensors, such as a pressure gauge, a thermometer, a velocity sensor, an accelerometer, a position sensor, an optic sensor, an ammeter, a voltmeter, etc. According to one embodiment the electronic unit is suitable to wirelessly communicate with different types of sensors, and according to another embodiment the unit is connected (by wires or otherwise) to the sensors. According to another embodiment of the invention, the electronic unit is suitable to receive data from the sensors, process the data and provide instructions, and/or suitable to communicate and control flow valves of the generator. According to yet another embodiment of the invention, the electronic unit is suitable to communicate with an external device. The electronic unit can also further comprise a screen.

According to another embodiment of the invention, the generator further comprises a bearing-divider, which is located between one piston of the first set of expansion pistons, and an adjacent piston of the second set of expansion pistons.

According to another embodiment of the invention, at least one piston comprises a rubber section, which can also be suitable to perform as a sealing ring.

According to one embodiment of the invention, the linear electric generator further comprises a rebound mechanism between the partitions and the electric power-generating pistons of third set of pistons, which can be, for example, an air-spring.

According to another embodiment of the invention, the expansion chamber is suitable to be used as an internal combustion chamber, and can further comprise fuel/fuel-air-mixture injection components.

According to another embodiment of the invention, the linear electric generator further comprising an internal fluid chamber and an external fluid chamber, wherein the external chamber comprises an air expansion chamber and a work fluid chamber, and wherein the work fluid chamber of the external fluid chamber is connected to the internal fluid chamber by connecting element(s), the connecting element(s) can be, for example, a tube suitable to host fluids.

The present invention also refers to a method for energy transformation, which comprises the following steps:
1. providing a generator that comprises at least one intake port, at least one expansion chamber, at least one expansion piston, and at least one central cylinder, said central cylinder being in communication at its two ends with at least two reduced cylinders having a diameter smaller than the diameter of the central cylinder, and wherein each reduced cylinder comprises a partition;
2. providing at least one electric power-generating set of pistons suitable to linearly move inside the inner void of a reduced cylinders through the partitions of the reduced cylinders, each said piston being connected to an oscillator;
3. providing at least one fluid chamber adapted to contain incompressible fluid.
4. providing at least two sets of magnets, each set of magnets being attached to an oscillator;
5. providing at least two end sections comprising coil windings; Providing at least one outlet port, suitable to allow the evacuation of fluids from said expansion chamber; and
6. causing a compressed fluid to flow into said central cylinder thereby to create an oscillatory motion of said oscillator, thereby to generate inductive current in said coil windings.

According to one embodiment of the invention, the compressed fluid is air, and according to another embodiment of the invention the method comprises using an incompressible fluid that acts as a flexible liquid connecting rod for mechanical motion transmission.

A DETAILED DESCRIPTION OF THE INVENTION

The present invention relates to a linear electric generator, which can also be referred to simply as "engine" along the description, for the sake of brevity. The engine, according to the present invention, comprises a central cylinder; an expansion chamber, which is located in the central cylinder; an intake port through which a working fluid enters into the expansion chamber; a fluid outlet port(s); at least one pair of working (i.e. expansion) pistons; liquid connecting rod made of incompressible fluid (wherein the phrase "incompressible" refers not only to fluids that, even under high pressure, keep a constant density, but also to fluids that the change in their density under high pressure is relatively small so that it can be negligible, which can also be referred to as "essentially incompressible", for example, hydraulic fluid); and at least one pair of oscillators to which permanent magnets are attached.

A significant advantage of the present invention, as will be further described with reference to the drawings, is the use of an incompressible (or essentially incompressible) fluid that acts as a flexible liquid connecting rod for mechanical motion transmission. As a result, no energy is wasted on the compression itself, and the momentum transfer can be maximized. The use of a fluid replaces the use of a mechanical connecting rod for motion transmission, which allows the decoupling of expansion stroke of the working piston in the expansion chamber to the stroke of the oscillator driving magnets through the coils, as well as saves energy (e.g., of heat as a result of friction) and reduces wearing of the components.

Another phrase that is used along the description is "reduced cylinder", which describes the reduced diameter of the cylindrical housing of the oscillators, which is smaller than the diameter of the central expansion cylinder. This reduced cylinder together with the liquid connecting rod allows the elongation of the oscillator's stroke when driven by a shorter stroke of the working pistons.

The operation of the generator is based on the insertion of a fluid into the expansion chamber. Said fluid is also referred to as "inlet fluid", and can be, for example, compressed air. The reduced cylinder allows increasing the stroke length and speed of the magnets attached to an oscillator without having to increase the volume of the inlet fluid or its pressure.

According to the present invention, references are made to the accompanying drawings in the following detailed description, which illustrate one exemplary embodiment of the invention. This embodiment may be combined with other components, other embodiments may be utilized, and other changes may be made without departing from the spirit or scope of the present invention.

Figure 1:
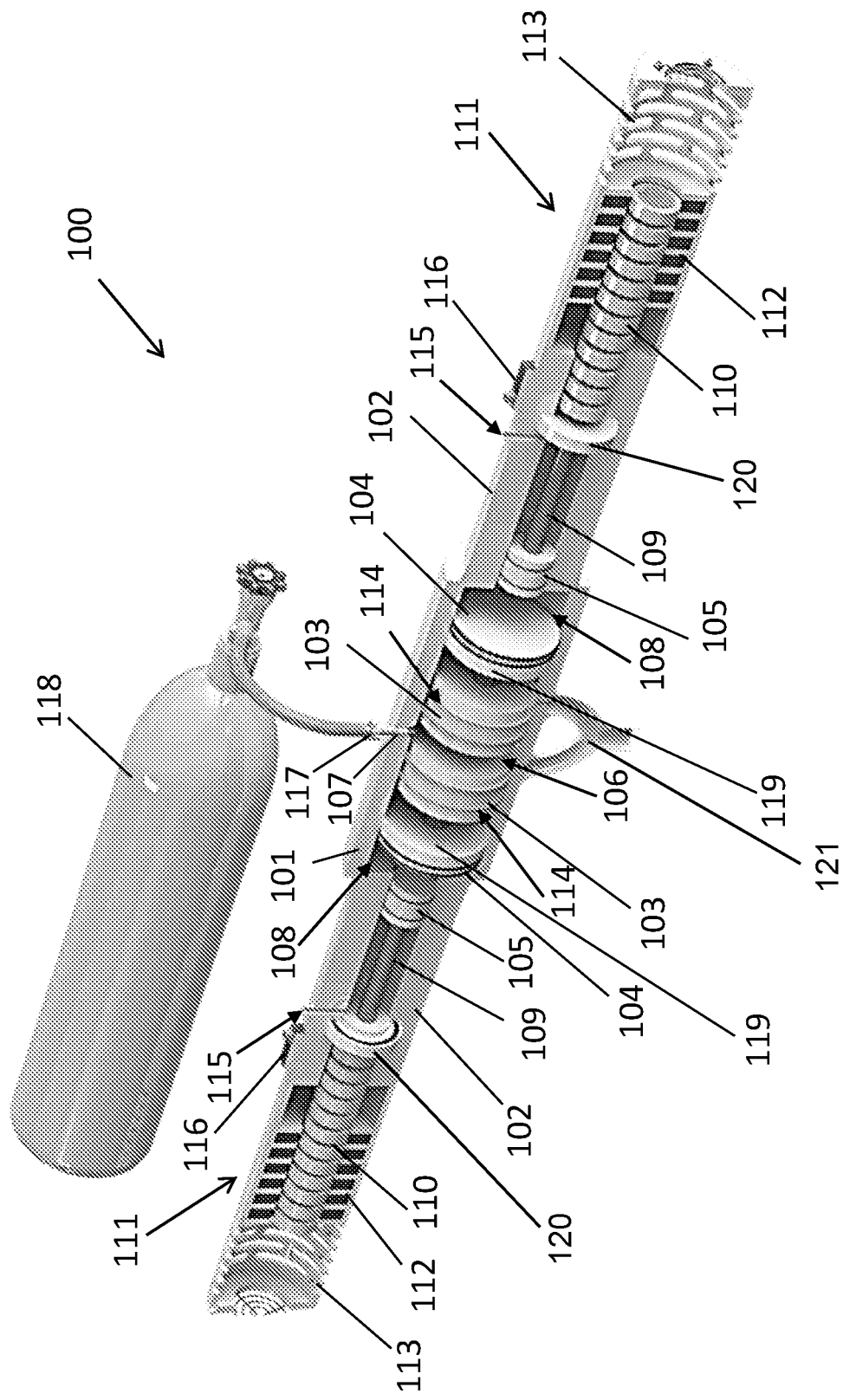
FIG. 1 is a perspective cross-sectional view of an FPLG, according to one embodiment of the invention, wherein the two pistons of the first piston set are close to one another, at an initial position, prior to the expansion process.

FIG. 1 shows a perspective cross-sectional view of the apparatus, according to one embodiment of the invention, illustrating an exemplary free-piston linear generator (FPLG) 100. FPLG 100 comprises a central cylinder 101 and a pair of reduced cylinders 102, wherein the diameter of reduced cylinders 102 is smaller than the diameter of central cylinder 101.

FIG. 1 also shows three sets of pistons—first piston set 103, second piston set 104, and third piston set 105. FPLG 100 comprises three opposed piston sets—the inner volume of central cylinder 101 comprises first piston set 103 and second piston set 104, and reduced cylinder 102 comprises third piston set 105. Expansion chamber 106 is located between first set of pistons 103. Central cylinder 101 is suitable to allow the insertion of an intake port, such as intake port 107, through which an inlet working fluid, such as compressed gas (e.g., air), flows and expands into expansion chamber 106.

Figure 2:
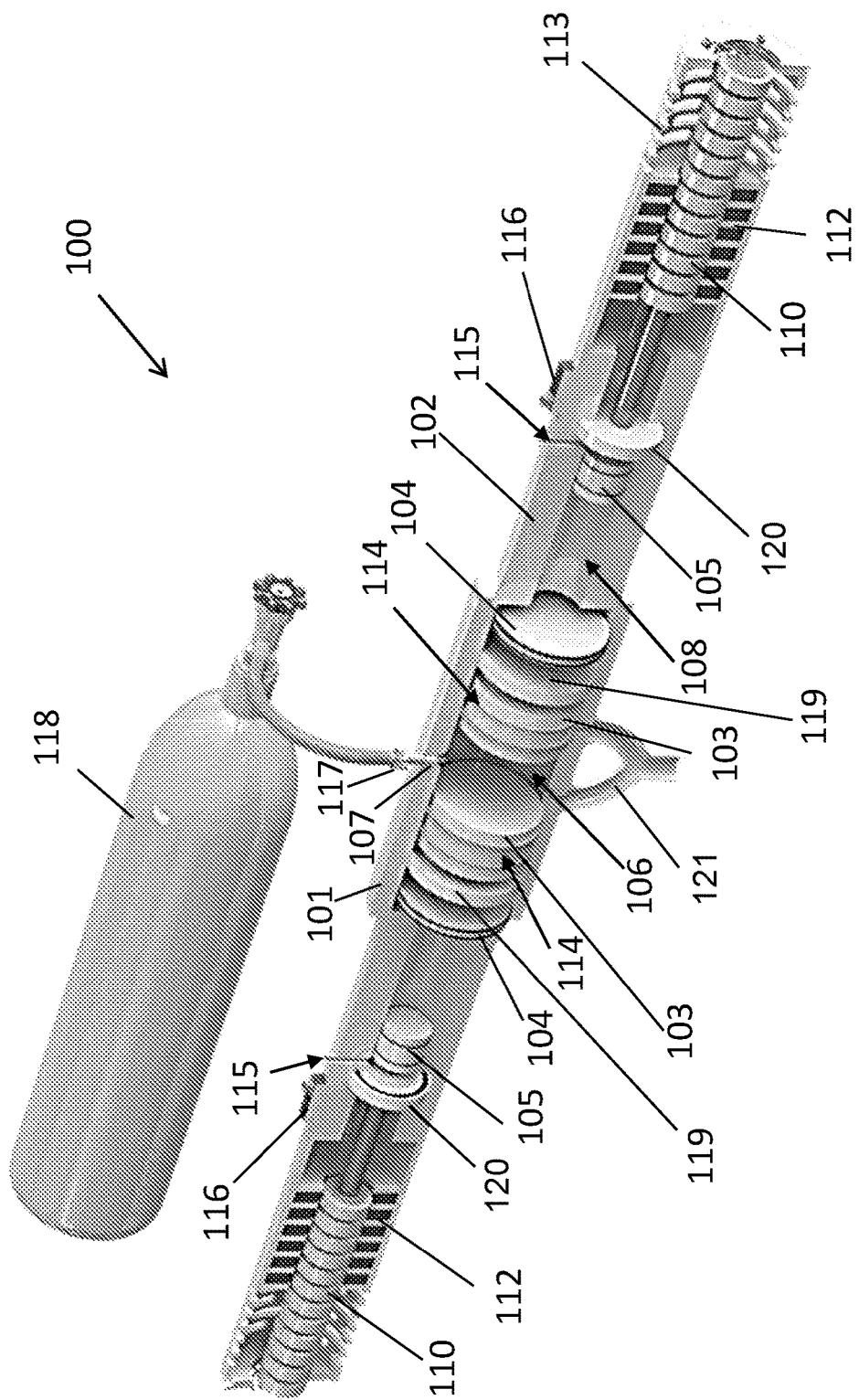
FIG. 2 is a perspective cross-sectional view, similar to the one of FIG. 1, but in a position wherein the two pistons of first piston set are at a greater distance from one another in relation to the initial positioning that is shown in FIG. 1, as a result of flow within the expansion camber.

FIG. 1 shows a position wherein the two pistons of first piston set 103 are close to one another, at an initial position, prior to the expansion that occurs when an inlet working fluid enters expansion chamber 106. FIG. 2 shows a perspective cross-sectional view, similar to the one of FIG. 1, but in a position wherein the two pistons of first piston set 103 are at a greater distance from one another in relation to the initial positioning that is shown in FIG. 1. The distance between said pistons occurs when an inlet fluid enters expansion chamber 106, thus applies pressure on said piston and causes their expansion movement.

FIGS. 1 and 2 also show outlet ports 121, suitable to allow the evacuation of fluids from expansion chamber 106. According to this specific embodiment outlet ports 121 are connected to the inner volume of central cylinder 101 by slots (not shown) that are located inside the walls of central cylinder 101, which allow the fluid to flow from expansion chamber 106 into outlet ports 121, but of course, the number and location of said slots and outlet ports may vary according to the necessary expansion stroke length and outlet flow required for optimal operation.

FIG. 1 also shows fluid chambers 108, suitable to contain an incompressible fluid that acts as a flexible liquid connecting rod, which connects the working pistons to the oscillators and allows a smooth mechanical movement transfer. As a result, when the pistons of second piston set 104 move away from expansion chamber 106, they push said incompressible fluid that pushes the pistons of third set of pistons 105, which are connected to oscillators 109. Each piston of first set of pistons 103 is connected to each piston of second set of pistons 104 and separated by a bearing-divider 119.

When the pistons of third set of pistons 105 is pushed toward the sides of the apparatus by second set of pistons 104, the incompressible fluid that is initially located inside the inner void of central cylinder 101 is forced to enter the void of reduced cylinder 102, and since the diameter of reduced cylinder 102 is smaller, it will increase the velocity of the fluid, which reflects directly on the speed of oscillators 109, which are connected to the pistons of third set of pistons 105.

Magnets 110 are firmly attached to oscillator 109, which according to this embodiment are permanent magnets. FPLG 100 also comprises end sections 111 that are suitable to host magnets 110 and comprise coil windings 112 and ventilation openings 113. According to another embodiment, one may switch between the magnets and the coils.

When magnets 110 move within end sections 111, permanent magnets 110 move with respect to the corresponding coil windings 112, thus creating an electric current. The coil windings can be made, for example, of a number of rectangular-shaped wiring (wherein each of them creates a slot of coils) that may result in an increased number of turns in each slot, thus increased current density and ultimately power output.

The edges of magnets 110 and/or the edges of end sections 111 can also comprise a rebound mechanism, such as an air-spring or a mechanical spring, in order to trigger the reversed motion of the components toward the center of FPLG 100. When the components return to their initial position another cycle can take place.

According to the embodiment of FIGS. 1 and 2, coil windings 112 are divided into slots, thus the system "knows"—by the value of the current received at each moment in a control unit (which is also referred in further description as "an electronic unit"—how much current is received from each coil, which indicates the location of magnets 110 within end sections 111, thus allowing to control the timing of different actions, such as the intake timing of the working fluids.

Each piston has a diameter essentially the size of the diameter of its corresponding cylinder in order to seal each chamber. According to one embodiment of the invention, all or some of the pistons can comprise rubber sealing rings or rubber sections additive at its circumference for improved sealing abilities, as rubber 114 that is shown in FIGS. 1 and 2.

According to some embodiments of the invention, FPLG 100 comprises one or more sensors or pressure gauges (not shown in the figures). Such sensors can provide, for example, pressure, temperature, speed or motion monitoring, thus providing the ability to process such measurements and use them in order to control the apparatus, as well as to enable to schedule the cycles of FPLG 100. According to one embodiment of the invention, such sensors are located at different locations inside FPLG 100, which do not interfere with the movements of the internal components, and are suitable to communicate with an external electronic unit. According to another embodiment of the invention, such sensors are connected to an electronic unit by wires and reach the inner void of FPLG 100 by passing through designated drills. Although the drills are not shown in the figures, it is obvious to any person skilled in the art how to combine them with the generator of the present invention.

According to some embodiments of the invention, FPLG 100 comprises a rebound mechanism. Referring to the embodiment of FIGS. 1 and 2, as aforesaid, end sections 111 can also comprise a rebound mechanism, such as an air-spring or a mechanical spring of any kind, in order to trigger the reversed motion of the components toward the center of FPLG 100. Another location suitable for the positioning of an air-spring is the inner void of reduced cylinder 102, between partitions 120 that are firmly connected to reduced cylinders 102 and pistons of set 105. As the pistons of third set of pistons 105 move away from the center of generator 100, the fluid that is located in said void of reduced cylinder 102 is compressed, since the location of partitions 120 is constant, while pistons of set 105 are in motion. As a result, the pressure in said volume increases, thus causes a reversed motion of the pistons of set 105.

FIGS. 1 and 2 also show holes 115 in reduced cylinder 102, provided as a fluid inlet, suitable to allow the inlet of fluids into the void between the pistons of set 105 and partitions 120, thus provide the ability to control the pressure inside said volume that can function as an air-spring. According to another embodiment of the invention, FPLG 100 also comprises an external pressure sensor that is integrated with the air inlets—holes 115, allowing to control the pressure and mass of fluid that enters the void of reduced cylinders 102, which can also be referred to as "the rebound volume/chamber".

Another possible location for sensors is the edges of end sections 111, and according to another embodiment of the invention, said edges of sections 111 house a rebound air-spring chambers. According to one embodiment of the invention, the edges of sections 111 are sealed and are suitable to be used as the chambers, and according to another embodiment of the invention, sections 111 comprise separate internal air-spring chambers (not shown in the figures). Of course, the invention is not limited to any specific locations for the placement of sensors and/or rebound mechanisms, and suitable access points for different sensors can obviously be very easily added to the apparatus by any person skilled in the art. According to an embodiment of the invention, the intake of fluid can be timed according to the position of the pistons which can be controlled by either using suitable sensors that detect position, or simply by the measurement of the induced electric current generated by each coil, which indicates the position of magnets 110 in relation to coil windings 112.

According to one embodiment of the invention, FPLG 100 also comprises an electronic unit, such as electronic units 116 that is shown in FIGS. 1 and 2, which receives information from the different sensors and the output of the apparatus (such as electric current, voltage, frequency, etc.), and according to the current and voltage data measurements the location of magnets 110 with respect to their velocity can be easily calculated. According to another embodiment of the invention, unlike the embodiment of FIGS. 1 and 2 that comprises two electronic units (one for each side of the apparatus), the FPLG comprises a single electronic unit that receives information from all sensors regarding all of the components of the apparatus. According to another embodiment of the invention, the electronic unit, such as units 116, is suitable to communicate with a distant additional electronic unit and/or a computer and/or a smartphone and/or a data processing unit. The electronic unit(s) of the FPLG, according to another embodiment, comprises a screen and is also suitable to present and monitor data on said screen.

According to another embodiment of the invention, the electronic unit can also send commands to a user and/or to regulating components, such as flow valves, or any other components that control the operation of the FPLG, and the gathered information regarding the performance of the FPLG can indicate the need for change, for example, flow rate of the intake working fluid, or the frequency of the engine in order to control load and obtain the desired output. FIGS. 1 and 2 show an exemplary flow valve 117 that controls the flow of intake working fluid from its source—in this case, a compressed-air tank 118, into expansion chamber 106, through intake port 107.

It should be noted that the invention is not restricted in any way to the use of compressed air, or to any types of materials (such as the incompressible fluid or the fluid located between the pistons of the third set of pistons and the petitions). It should also be noted that the use of compressed air or other fluids can be replaced with other methods that provide the increase of pressure within the expansion chamber, thus causing the movements of the pistons of the engine. Such common method is, for example, the internal combustion method, that can easily replace the use of pressurized fluids in the apparatus of the present invention. Of course, it requires slight structural adjustments, such as a fuel injection component, for example, but since it is a well-known method, it can obviously be performed very easily by any person skilled in the art.

According to the embodiment of FIGS. 1 and 2, upon demand for electricity, compressed air, which is initially stored inside compressed-air tank 118, is injected into expansion chamber 106. As a result, the compressed air expands in expansion chamber 106 and drives the pistons of the first set of pistons 103 in a linear motion. The movement of the first set of pistons 103 causes the movement of the second set of pistons 104 in the same direction, wherein the two sets 103 and 104 are located inside the void of central cylinder 101. Then the movement of second set 104 causes the movement of the third set of pistons 105 by a forced flow of the incompressible liquid from cylinder 101 into reduced cylinder 102, wherein the third set 105 is located inside the void of reduced cylinder 102. As aforesaid, fluid chamber 108, which is located between the second and third sets of pistons (104 and 105), comprises an essentially incompressible fluid that acts as a liquid connecting rod and performs as a mean for motion transfer, without a substantial energy loss in the process.

As previously mentioned, and shown in FIGS. 1 and 2, FPLG 100 comprises partitions 120, which in addition to the fact that they are firmly connected to reduced cylinders 102, thus perform as barriers in the inner volume of cylinder 102, they also allow the linear movement of oscillators 109, which slide through them. Partitions 120 also restrict the distance that the pistons of the third set of pistons 105 can travel, thus restricting the motion of magnets 110.

It should be noted that, as shown in FIGS. 1 and 2, since fluid chamber 108 is defined by the spaces between the pistons of the second (104) and third (105) sets of pistons, the size and location of chamber 108 depends on the location of the adjacent pistons and not by a hard specific structure.

FIGS. 1 and 2 also show bearing-dividers 119, which are located in the space between piston sets 103 and 104 at a constant location. In FIG. 1, bearing-dividers 119 are closer to the pistons of set 104, in order to allow the pistons of set 103 to move away from the centre of the apparatus. However, in FIG. 2, bearing-dividers 119 are closer to the pistons of set 103, since they moved toward bearing-dividers 119 while the pistons of set 104 move away from bearing-dividers 119. Such bearing-dividers provide a maximal distance for said pistons, and reduce the need for additional hard components, and instead the fluid (such as air) between them provides motion transfer as a result of the applied pressure. Bearing-dividers 119 are also suitable to prevent the flow of fluids by performing as sealing components.

Figure 3:
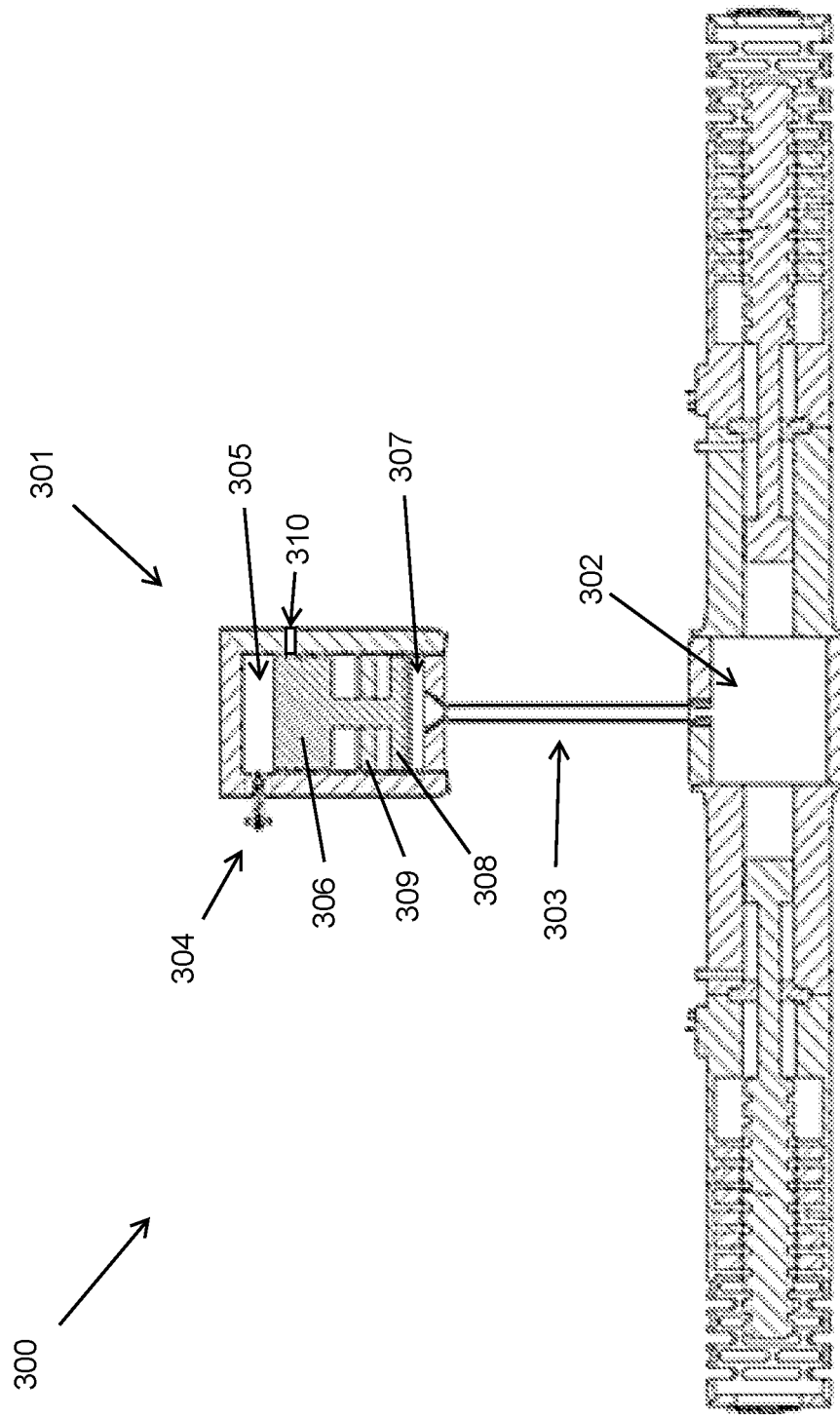
FIG. 3 is a front cross-sectional view of an FPLG, according to another embodiment of the invention, comprising an external fluid chamber, an internal fluid chamber, and a connection element between them.

FIG. 3 is a front cross-sectional view of an FPLG 300, according to another embodiment of the invention, comprising external fluid chamber 301, internal fluid chamber 302, and a connection element 303 between them. The embodiment of FIG. 3 is similar to the embodiment of FIGS. 1 and 2, apart from the fact that central cylinder 101, along with its accompanied components, is replaced with external fluid chamber 301, internal fluid chamber 302, and connection element 303. According to this embodiment, fluid chamber 301 comprises intake port 304, through which fluid, such as compressed air, can be inserted into chamber 305. While fluid is inserted, it expands the volume of air expansion chamber 305, pushing expansion piston 306 downward and creating an expansion stroke.

FPLG 300 also comprises work fluid chamber 307, wherein said fluid acts as a flexible liquid connecting rod for mechanical motion transmission, as previously mentioned with reference to FIGS. 1 and 2. The movement of piston 306 forces the liquid that is located within chamber 307 to flow through connection element 303 and reach internal fluid chamber 302. Said element 303 can be, for example, a tube, or any other passageway for fluids.

Similarly to the first embodiment, as a result of fluid entering fluid chamber 302, the incompressible fluid flows into the reduced cylinder, driving the magnet oscillator through the surrounding coils, and generating electric power.

Piston 306 consists partition 309 that forces the liquid into element 303, and chamber 301 further comprises divider 308 that separates the working fluid of chamber 305 from the motion transfer fluid of chamber 307. According to the present embodiment, chamber 305 comprises compressed air, chambers 302 and 307 comprise a motion transfer liquid, which is an incompressible fluid, such as oil. The fluid inside the volume between piston 306 and divider 308 is air, and the fluid inside the volume between divider 308 and partition 309 is also air, but of course can be replaced with any other fluid suitable to operate with the pressure values of the FPLG The void between elements 308 and 309 can also be in a vacuum state. FPLG 300 further comprises an exhaust port 310. While expansion piston 306 moves downward, it uncovers port 310. At the same time, as a result of the expansion, air pressure in chamber 305 drops, and the air of chamber 305 exit the volume through port 310.

One advantage of the present embodiment is the fact that only one piston is required in order to generate the movement of both oscillators, which according to the previous embodiment, required two separate pistons, which is also a significant advantage in relation to the prior art. The use of a smaller number of components is obviously more cost efficient, and can also reduce the need for maintenance.

Another significant advantage of the present embodiment is the fact this version shortens the total length of the generator, and in addition, allows geometrical flexibility since chamber 301 and connection element 303 are not restricted to a specific location or distance from the rest of the components of the FPLG. As will be appreciated by a skilled person in the art, the generated electric current may run through an advanced set of power electronics, including rectifiers and frequency converters/adaptors, to regulate and optimize the system's electric output. The electric output of the linear electric generator is directly proportional to the product of the velocity of the oscillator and the stroke length it travels. According to the present invention, and as a result of the flexible liquid connecting rod combined with the integration of the reduced cylinder, the velocity, as well as the stroke length that the oscillator travels, are multiplied by a ratio equals to the square of the ratio of the large diameter of the central expansion cylinder and the diameter of the reduced cylinder, which can be referred to as the "elongation factor". This results in an amplification of the electric power output by a ratio equals to the square of the "elongation factor". The present invention provides a significant advantage over the prior art by generating useful magnitude of electric power from a fairly short expansion stroke, i.e., from a relatively small expansion work volume that is suitable to be triggered by a relatively low-pressure working fluid. The shorter expansion stroke increases the oscillation frequency of the oscillator and ultimately lends additional increase in power output.

According to one embodiment of the invention, the expansion chamber is a relatively low-weight expansion chamber made of low-weight metal composites or polymer-based composites, but of course, the expansion chamber of the present invention is not limited to any specific type of material, and is not restricted to a certain weight. The same applies to all components and materials of the present invention, in particular the magnet oscillator.

According to the present invention, the reduced cylinder provides a stroke elongation mechanism that allows operation on low air pressures (which translates into increased efficiency). In addition, it shortens the expansion stroke, which increases the operating frequency and ultimately increases power output. The stroke elongation mechanism elongates the oscillator's stroke and amplifies its velocity by a factor that is a square of the diameter ratio between the large cylinder and the small cylinder, which yields elevated power output. An additional advantage is that, when using compressed air as a working fluid, the shortened expansion stroke delivers a lower pressure ratio and reduces air cooling, which subsequently reduces condensing flow effects. Moreover, it reduces system sensitivity to pressure fluctuation, as well as significantly reduces consumption of the working fluid and contributes to the robustness of the engine.

A significant advantage of the invention over the prior art is the fact that the combination of a single expansion chamber with double oscillators, wherein the oscillators are located in a reduced cylinder, provides a reduction in the working fluid consumption and a higher efficiency and power density. In addition to the great advantage of improving the efficiency of the engine, using ultra-low temperature and low-pressure working fluid reduces mechanical and thermal loads and allows the utilization of light-weight materials with minimal rigidity and thermal resistance, which significantly decreases the total weight of the generator, while increasing the produced power.

Along with the description, references are made to "fluid", and it should be noted that the phrase refers to any fluid, gas or liquid, such as air, hydraulic fluid, a mixture of gases, etc. According to some embodiments of the invention, the fluid that flows into the expansion chamber can also be redirected and reused in repeating strokes.

According to another embodiment of the invention, the double expansion/working pistons and the double oscillators can be assembled in a parallel configuration (known as dual module system in common FPLG engines). In such parallel configuration, the engine comprises two separate expansion chambers, each adapted to drive the pistons and oscillator of each configuration in opposite directions. In other words, the engine can be assembled in such a way that both sides are parallel and opposite (for balance), instead of in one line as shown in the figures.

Although embodiments of the invention have been described by way of illustration, it will be understood that the invention may be carried out with many variations, modifications, and adaptations without exceeding the scope of the claims.

The invention claimed is:

1. A linear electric generator, comprising:
   a) at least one intake port;
   b) at least one expansion chamber, and at least one expansion piston located within a central cylinder;
   c) the central cylinder;
   d) at least two reduced cylinders, each having a diameter smaller than the diameter of the central cylinder, and wherein each reduced cylinder comprises a partition;
   e) at least one electric power-generating piston located within each of the reduced cylinders and capable of linear movement through the partitions of the reduced cylinders, and wherein each piston is connected to a respective oscillator;
   f) at least one fluid chamber suitable to contain incompressible fluid, wherein said fluid chamber is defined as the void between the edge of the expansion piston closest to the electric power-generating pistons and the electric power-generating pistons themselves;
   g) at least two sets of magnets, wherein each set of magnets is attached to one of the respective oscillators;
   h) at least two end sections that comprise coil windings; and
   i) at least one outlet port, suitable to allow the evacuation of fluids from said expansion chamber.

2. The linear electric generator according to claim 1, further comprising:
   at least one first set of expansion pistons, and at least one second set of expansion pistons,
   each set located within the central cylinder and functioning independently;
   and at least two fluid chambers that contain incompressible fluid, wherein each additional fluid chamber is the void between an expansion piston from the first or second set, and an adjacent electric power-generating piston.

3. The linear electric generator according to claim 2, further comprising a bearing-divider, which is located between one piston of the first set of expansion pistons, and an adjacent piston of the second set of expansion pistons.

4. The linear electric generator according to claim 1, wherein the intake port is suitable to be connected to an intake fluid source by suitable connection means.

5. The linear electric generator according to claim 1, wherein the end sections further comprise a rebound mechanism.

6. The linear electric generator according to claim 5, wherein the rebound mechanism is chosen from a group of the following mechanisms: an air-spring, a mechanical spring.

7. The linear electric generator according to claim 1, further comprising at least one electronic unit.

8. The linear electric generator according to claim 7, wherein the electronic unit is suitable to wirelessly communicate with different types of sensors.

9. The linear electric generator according to claim 7, wherein the electronic unit is connected to different types of sensors.

10. The linear electric generator according to claim 7, wherein the electronic unit is suitable to communicate and control flow valves of the generator.

11. The linear electric generator according to claim 7, wherein the electronic unit is suitable to communicate with an external device.

12. The linear electric generator according to claim 1, further comprising one or more sensors selected from the group consisting of: a pressure gauge, a thermometer, a velocity sensor, a position sensor, an accelerometer, an optic sensor, an ammeter, an inductance sensor, and a voltmeter.

13. The linear electric generator according to claim 12, wherein the electronic unit is suitable to receive data from the sensors, process the data and provide instructions.

14. The linear electric generator according to claim 1, wherein any of the pistons, including expansion pistons and electric power-generating pistons, can comprise a rubber section.

15. The linear electric generator according to claim 1, wherein the coil windings are made of rectangular-shaped wiring.

16. The linear electric generator according to claim 1, further comprising a rebound mechanism between the partitions and the electric power-generating pistons.

17. The linear electric generator according to claim 1, wherein the expansion chamber is suitable to be used as an internal combustion chamber.

18. The linear electric generator according to claim 1, further comprising an internal fluid chamber and an external fluid chamber, wherein the external chamber comprises an air expansion chamber and a work fluid chamber, and wherein the work fluid chamber of the external fluid chamber is connected to the internal fluid chamber by connecting element(s).

19. A method for energy transformation, comprising:
   a) providing a generator that comprises at least one intake port, at least one expansion chamber, and at least one expansion piston, and at least one central cylinder, said central cylinder being in communication at its two ends with at least two reduced cylinders having a diameter smaller than the diameter of the central cylinder, and wherein each reduced cylinder comprises a partition;
   b) providing at least one electric power-generating set of pistons suitable to linearly move inside the inner void of a reduced cylinders through the partitions of the reduced cylinders, each said piston being connected to one of two structurally and functionally identical oscillators, designated as a first and a second oscillator based on their respective locations;
   c) providing at least one fluid chamber adapted to contain incompressible fluid;
   d) providing at least two sets of magnets, each set of magnets being attached to one of the respective oscillators, with the first set of magnets connected to the first oscillator and the second set of magnets connected to the second oscillator;
   e) providing at least two end sections comprising coil windings;
   f) providing at least one outlet port, suitable to allow the evacuation of fluids from said expansion chamber; and
   g) causing a compressed fluid to flow into said central cylinder thereby to create an oscillatory motion of both said first and second oscillators, thereby to generate inductive current in said coil windings.

20. The method of claim 19, wherein the generator comprises an incompressible fluid that acts as a flexible liquid connecting rod for mechanical motion transmission.

* * * * *